(12) United States Patent
Lala et al.

(10) Patent No.: US 9,594,491 B2
(45) Date of Patent: Mar. 14, 2017

(54) SLIDE CONTROL FOR SETTING BOUNDARIES BETWEEN REGIONS OF A DATA RANGE

(71) Applicant: CA, Inc., Islandia, NY (US)

(72) Inventors: Nicholas Lala, Raleigh, NC (US); John Bailey, Durham, NC (US)

(73) Assignee: CA, Inc., New York, NY (US)

( * ) Notice: Subject to any disclaimer, the term of this patent is extended or adjusted under 35 U.S.C. 154(b) by 546 days.

(21) Appl. No.: 13/684,980

(22) Filed: Nov. 26, 2012

(65) Prior Publication Data

US 2014/0146068 A1    May 29, 2014

(51) Int. Cl.
G09G 5/00    (2006.01)
G06F 3/0484    (2013.01)

(52) U.S. Cl.
CPC ................ *G06F 3/04847* (2013.01)

(58) Field of Classification Search
CPC .......... G06F 3/04847; G06F 17/30126; H04N 21/4312; G09G 5/003; G09G 5/00
USPC .......... 715/700, 833, 799, 800, 786
See application file for complete search history.

(56) References Cited

U.S. PATENT DOCUMENTS

| | | | |
|---|---|---|---|
| 2009/0177998 A1* | 7/2009 | Barrios et al. | 715/799 |
| 2010/0185976 A1* | 7/2010 | Sadanandan | 715/786 |
| 2010/0219950 A1* | 9/2010 | Kong | G06K 7/10009 340/540 |
| 2012/0030626 A1* | 2/2012 | Hopkins | G06F 3/04847 715/833 |

OTHER PUBLICATIONS

Alvaro Prieto Lauroba, "colResizable—jQuery plugin", Nov. 2, 2011. http://quocity.com/colresizable/.*
Hacker et al., "Photoshop—Tones, Contrast and Color ." Online blog. 6 pages. Sep. 14, 2012. Accessed at http://web.archive.org/web/20120914085633/http://multimedia.journalism.berkeley.edu/tutorials/photoshop/tonescontrast/.

* cited by examiner

*Primary Examiner* — Xiao Wu
*Assistant Examiner* — Chong Wu
(74) *Attorney, Agent, or Firm* — Coats & Bennett, PLLC

(57) ABSTRACT

According to an example computer-implemented method, user input is received indicating N regions within a data range of a data variable, where N is greater than or equal to three. A slide control is displayed representing the data range and the regions within the data range. The slide control includes N−1 sliders, with each slider representing a boundary between two of the regions. Responsive to movement of a selected slider, its associated boundary is reset. A determination is made of which one of the regions within the data range a received data variable value falls within. Based on the determination and the boundaries, the following items are displayed separately from the slide control: a graph of the data range that indicates which region the received data variable falls within, and a percentage value that indicates where the received data variable value falls within the data range.

18 Claims, 4 Drawing Sheets

SLIDE CONTROL FOR SETTING BOUNDARIES BETWEEN REGIONS OF A DATA RANGE

TECHNICAL FIELD

The present disclosure relates to a slide control, and more specifically relates to a slide control for setting boundaries between regions in a data range.

BACKGROUND

In the prior art, thresholds in a data range were set by selecting or entering numeric values using controls such as dropdown menus, entry fields, dropdown combo boxes, radio buttons, and checkbox controls. However, all of these approaches have inherent limitations. The controls that use predetermined values, such as dropdown menus, radio buttons and check boxes, artificially constrain the data range values that are available for selection. Also, the open-ended controls that allow any value to be entered, such as entry fields, require a high degree of familiarity with the data values and distribution of the data range, and are therefore error prone and time consuming to use.

SUMMARY

According to one aspect of the present disclosure, a computer-implemented method comprises receiving user input indicating N regions within a data range of a data variable, where N is greater than or equal to three. A slide control is displayed that represents the data range and the regions within the data range. The slide control includes N−1 sliders, with each slider representing a boundary between two of the regions. Responsive to movement of a selected slider, its associated boundary is reset.

According to another aspect of the present disclosure, a computing device comprises a user input device, a controller and a display. The controller is configured to receive, via the user input device, user input indicating N regions within a data range of a data variable, where N is greater than or equal to three. The display is configured to display a slide control representing the data range and the regions within the data range. The slide control includes N−1 sliders, with each slider representing a boundary between two of the regions. The controller is configured, responsive to movement of a selected slider, to reset its associated boundary.

According to another aspect of the present disclosure, a computer program product comprises a computer readable storage medium having computer readable program code embodied therewith. The computer readable program code comprises computer readable program code configured to receive user input indicating N regions within a data range of a data variable, where N is greater than or equal to three. The code also comprises computer readable program code configured to display a slide control representing the data range and the regions within the data range, with the slide control comprising N−1 sliders, with each slider representing a boundary between two of the regions. The code also comprises computer readable program code configured to reset the boundary associated with a selected slider responsive to movement of that slider.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
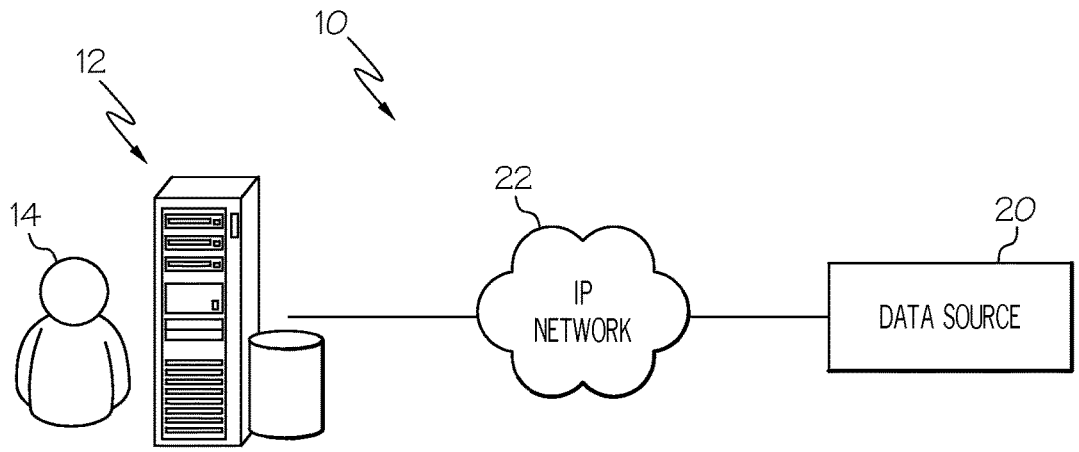
FIG. 1 is a block diagram of a communications network configured according to one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes a slide control for setting boundaries within a data range, with that data range having some significance to an analyst or other person viewing the data. Example slide controls 38 are shown in FIGS. 3A-C and FIG. 4. The slide control is broadly applicable to many different sensing, control and other data-monitoring applications. In one or more exemplary embodiments the data range is a range for a controlled or monitored process.

Figures 5, 6:
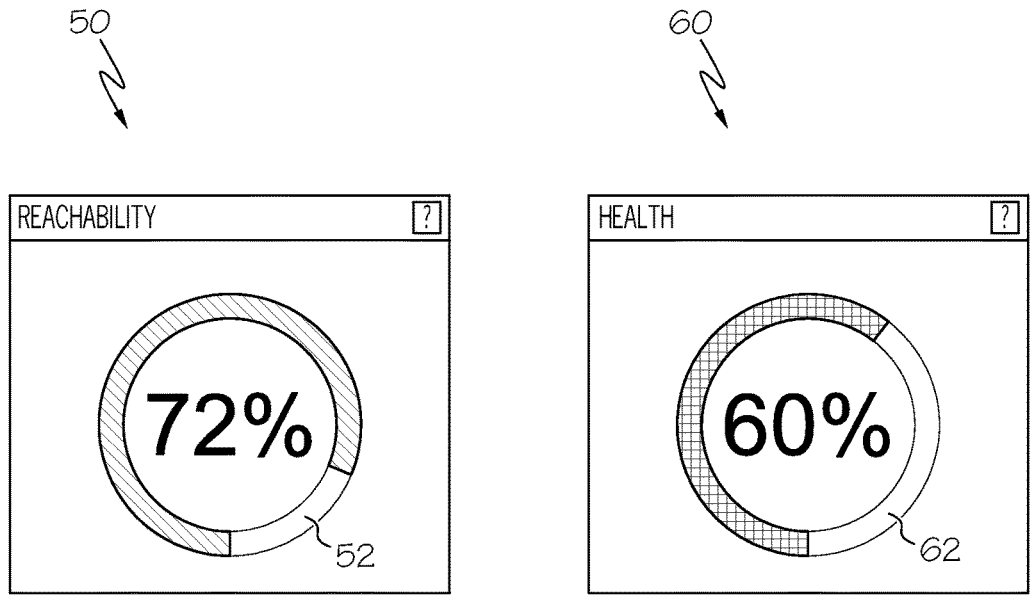
FIG. 5 is an example illustration of a data variable value and its associated data range.
FIG. 6 is another example illustration of a data variable value and its associated data range.

For example, in one specific embodiment the slide control is used by a network administrator to monitor resource usage of a server (e.g., bandwidth over a network connection, memory usage, etc.). Assuming the network administrator is monitoring bandwidth, the administrator would use the slide control to define bandwidth regions within a bandwidth range (e.g., from 0% to 100%) and the bandwidth regions could correspond to "low", "medium" and "high" bandwidth usage. Based on changes in bandwidth usage, a display utilizing these defined bandwidth regions could be updated to indicate which region the bandwidth usage falls within. Some example displays are shown in FIGS. 5-6. Instead of, or in addition to providing a display, the defined regions could be used to define alerts (e.g., send notification to network administrator if bandwidth enters "high" region). Thus, the boundaries between the data regions could serve as "trigger points" for such alerts. The displays of FIGS. 5-6 may be shown within a web browser, for example.

In another example embodiment, a user of the slide control is a supervisor in a commercial or industrial facility where machinery is operated. In this embodiment, the slide control is used for monitoring performance of a pressure valve, and the data range could be a range of pounds per square inch (PSI) values, for example. Here an analyst for the facility could use the slide control to define various pressure thresholds, and based on those thresholds could update pressure displays and/or set alerts or actions (e.g., if pressure enters "Critical" region transmit notification and shut down machine). In this embodiment, the slide control serves both a sensing and a monitoring function.

In other example embodiments, the slide control may be used to define regions for less technical applications, such as fundraising. A fundraising participant could use the slide control to set various financial goals within a larger fundraising data range (e.g., $0 at the low end of the range to a financial target at the high end of the range). Based on received fundraising data, a display could be updated to indicate where current fundraising levels resided with respect to the defined financial goals. In all of these examples, the slide control provides a convenient way for defining boundaries between regions of a data range, and can be used to implement a larger system in which such boundaries can be defined and used for monitoring various pieces of data. Of course, these examples are only non-limiting embodiments, but they nevertheless convey the broad applicability for the slide control discussed below.

Referring now to FIG. 1, a block diagram of a communications network 10 configured according to one exemplary embodiment is illustrated. The network 10 includes a computing device 12 operated by an analyst user and a data source 20. The computer 12 and the data source 20 are connected via an IP network 22, which may include a local area network (LAN) and/or a wide area network (WAN), such as the Internet. In the embodiment of FIG. 1, a computing device 12 displays a slide control to a user 14 on an electronic display. The user uses the slide control to define boundaries between regions within a data range. The data source 20 includes data variable values that the computing device 12 analyzes to create a display indicating a correlation between the data variable values and the data range, and/or to define alerts. Although only a single data source 20 is illustrated, it is understood that this is only a non-limiting example, and that additional data sources could be used. Also, although the computing device 12 is illustrated as a desktop computer, it is understood that this is only a non-limiting example, and it is further understood that the computing devices could correspond to a laptop computer, tablet computer, smartphone, PDA, or any other computing device. This will be explained in greater detail below with reference to FIGS. 2-6.

Figure 2:
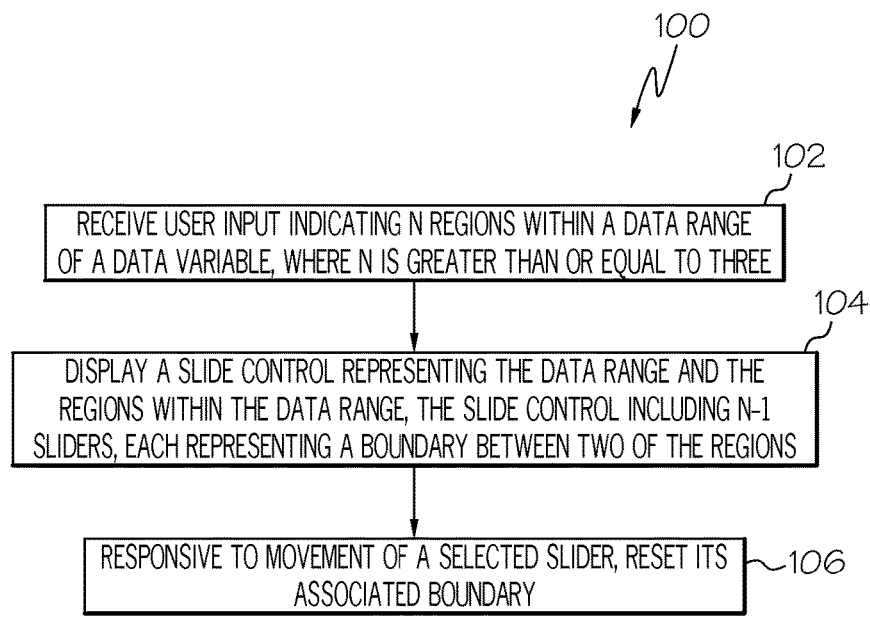
FIG. 2 is a flow diagram illustrating a method that defines regions within a data range.
Figure 3A:
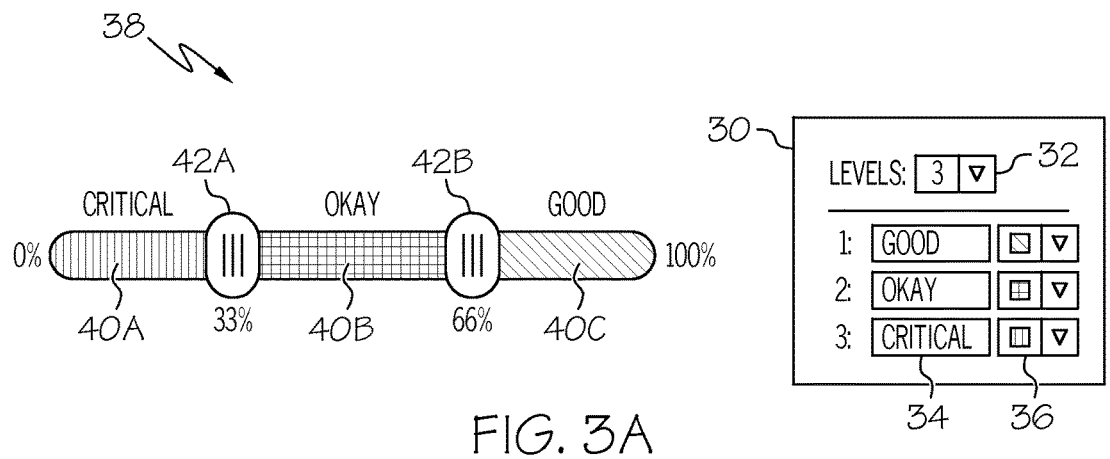
FIGS. 3A-C are illustrations of a first example slide control.

FIG. 2 is a flow diagram illustrating a method 100 for defining regions within a data range, with the method being implemented by a computer (e.g., computing device 12). User input is received that indicates N regions within a data range of a data variable, where N is greater than or equal to three (block 102). Referring to FIG. 3A as an example, in one embodiment the user input comprises selections provided via menu 30, and the data range spans from 0%-100%. The menu 30 includes a field 32 to select a quantity of regions (shown as "levels" in FIG. 3A), and optionally may also include fields 34, 36 for providing a label (e.g., "Critical," "Okay," "Good") and an associated display attribute (e.g., color and/or shading) for each region 40. Although three regions are illustrated as being selected (i.e., N=3), it is understood that this is only a minimum, and that more than three regions could be used (see, e.g., FIG. 4 where N=4). Responsive to a selection of a quantity of regions 40 through field 32, the menu 30 dynamically updates to provide a corresponding quantity of rows, each corresponding to a region. Thus, by selecting a region quantity of three, three rows of fields 34, 36 are dynamically displayed. In one example, the menu 30 may also be usable to define the operating range in question, in addition to its regions (i.e., to set the endpoints for the data range).

Responsive to the received user input (e.g., through fields 32-36), the slide control 38 representing the data range and the regions 40A-C within the data range is displayed (block 104). The slide control 38 includes N−1 sliders 42, with each slider 42 representing a boundary between two of the regions 40. Thus, in the example of FIG. 3, there are two sliders (as N−1=2). Slider 42A represents a boundary between regions 40A and 40B, and slider 42B represents a boundary between regions 40B and 40C. More specifically, the boundary provided by slider 42A between regions 40A and 40B represents an upper boundary region 40A and a lower boundary for the region 40B. Similarly, the boundary provided by slider 42B between regions 40B and 40C represents an upper boundary of region 40B and a lower boundary of region 40C. Of course, this dynamic could be changed by reversing the data range to span from 100% on the left to 0% on the right (instead of 100% on the right and 0% on the left). As shown in FIG. 3, based on the user input received through menu 30, each region 40 may be displayed according to its assigned display attribute (e.g., shading and/or color) and may have its associated label displayed next to it (e.g., "Critical," "Okay," "Good").

Figure 3B:
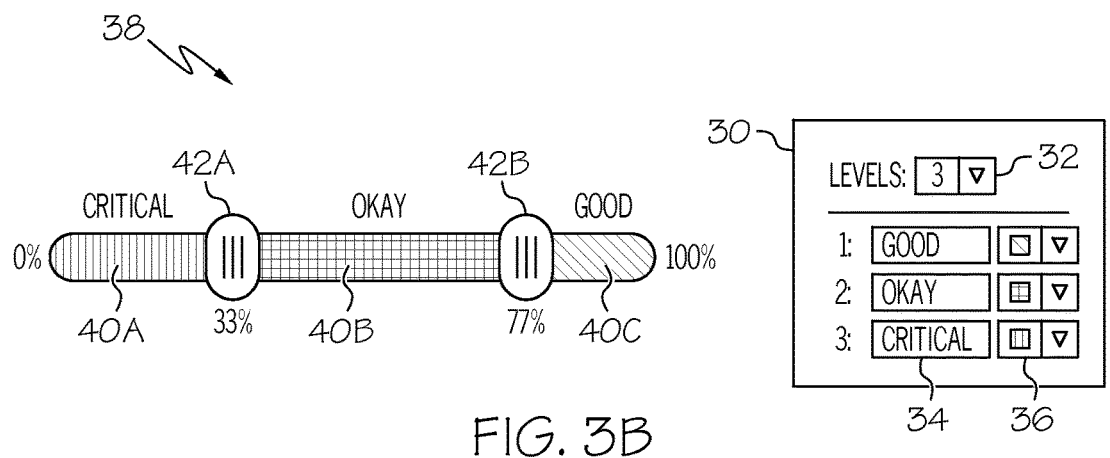
Figure 3C:
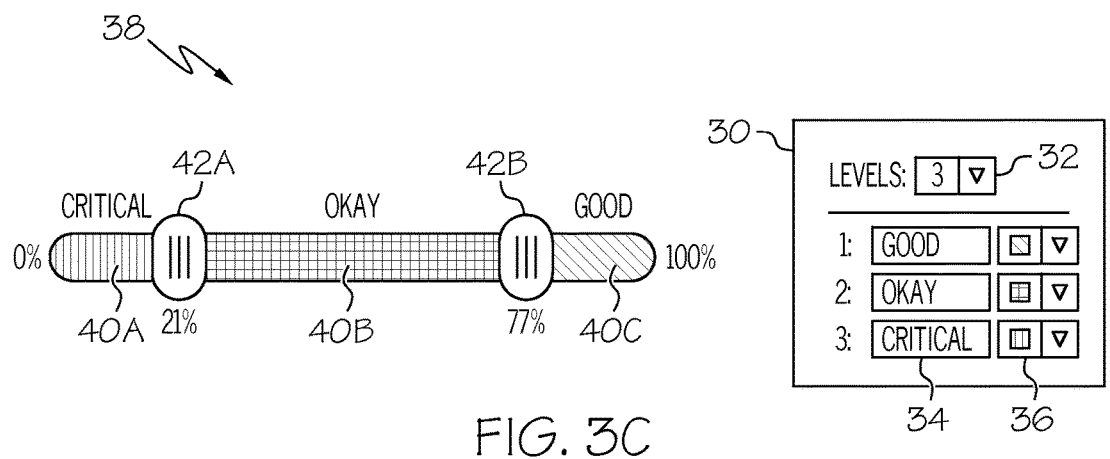
Figure 4:
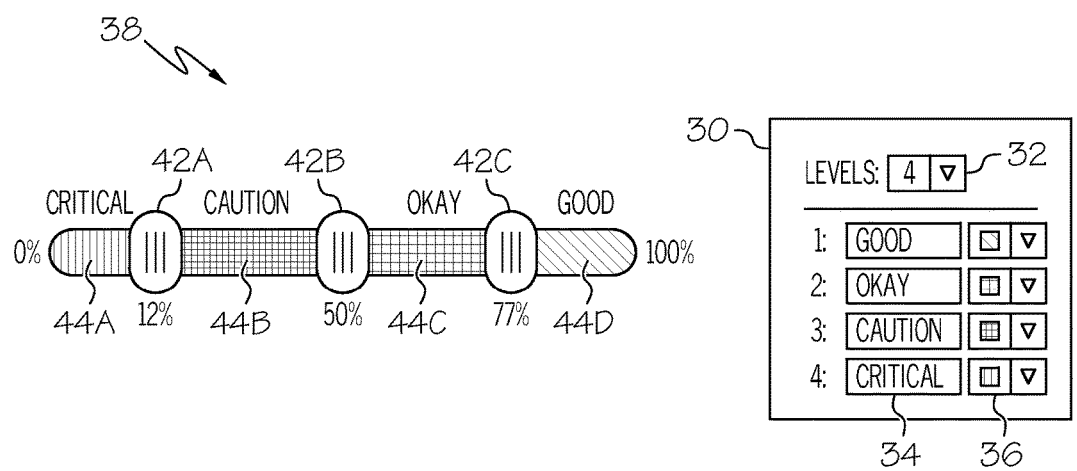
FIG. 4 is an illustration of a second example slide control.

Responsive to movement of a selected slider 42, its associated boundary is reset (block 106). FIGS. 3A-C illustrate this feature according to one or more embodiments. As shown in FIG. 3A, the sliders 42A, 42B initially have default positions at 33% and 66%, such that the regions 40A, 40B, 40C each have the same size, or substantially the same size. Responsive to movement of slider 42B from 66% to 77% (see FIG. 3B) the boundary between regions 40B and 40C is reset. Then, responsive to movement of slider 42A from 33% to 21% (see FIG. 3C) the boundary between regions 40A and 40B is reset.

Thus, as shown in the embodiment of FIGS. 3A-B, resetting the associated boundary of a slider (block 106) comprises varying the size of the regions 40 separated by the selected slider 42. Moreover, this varying includes increasing the size of a first one of the regions on a first side of the selected slider by a first amount, and decreasing the size of a second one of the regions on an opposite second side of the selected slider by the same amount. For example, in FIG. 3B the size of region 40B has increased by 11%, and the size of region 40C has decreased by 11% as compared to FIG. 3A.

In one or more embodiments, the slide control 38 is presented through a browser-based interface, such as through a desktop or mobile browser, or even a dedicated mobile application. In these and other embodiments, a user can adjust the sliders using, for example, a mouse, stylus, touchpad or touchscreen. Thus, the slide control 38 can, in some embodiments, be easily accessible through a mobile device with limited user input capabilities (e.g., devices whose primary input device is a touch screen).

Once the regions 40 have been set as desired by the analyst user 14, the regions 40 may be used to analyze a data variable value from data source 20. Thus, in one or more embodiments, a data variable value is received (e.g., a percentage on the data range), and based on the boundaries defined by the N−1 sliders of the slide control 38, a representation of the data range along with an indication of which region 40 the data variable value falls within is displayed to an analyst user 18.

FIG. 5 is an example illustration of a process variable value in the data range. As shown in FIG. 5, a doughnut graph 50 illustrates a "reachability" data variable value of 72%. In this example, 72% of a perimeter 52 of the graph is emphasized (e.g., colored or shaded) in accordance with the display attribute of the region in which 72% resides (e.g., illustrated using the display attribute 36 for the region). Thus, using the slide control 38 of FIG. 3A, 72% would fall in the "Good" region 40C, and the perimeter 52 is therefore shown according to the display attribute 36 for that region (e.g., green shading).

FIG. 6 is another example illustration of a process variable value in the data range. As shown in FIG. 6, a doughnut graph 60 illustrates a "health" data variable value of 60%. In this example, 60% of a perimeter 62 of the graph is emphasized (e.g., colored or shaded) in accordance with the display attribute of the region in which 60% resides (e.g., illustrated using the display attribute 36 for the region). Thus, using the slide control 38 of FIG. 3A, 60% would fall in the "Okay" region 40B, and the perimeter 62 is therefore shown according to the display attribute for that region (e.g., yellow shading).

Although the embodiments above have been described from the standpoint of a single analyst user operating the slide control 38 and viewing the displays of FIGS. 5-6, it is understood that other configurations could be used. For example, in one or more embodiments an administrative ("admin") user operates the slide control 38, but an analyst user only views the generated displays (e.g., FIGS. 5-6). In these embodiments, the admin and analyst users may use different computers (not just the single computing device 12 shown in FIG. 1). Also, it is understood that use of the fields 34, 36 is optional, and if an admin user 14 chose to leave those fields with blank and/or default values the slide control 38 could still be used.

Figure 7:
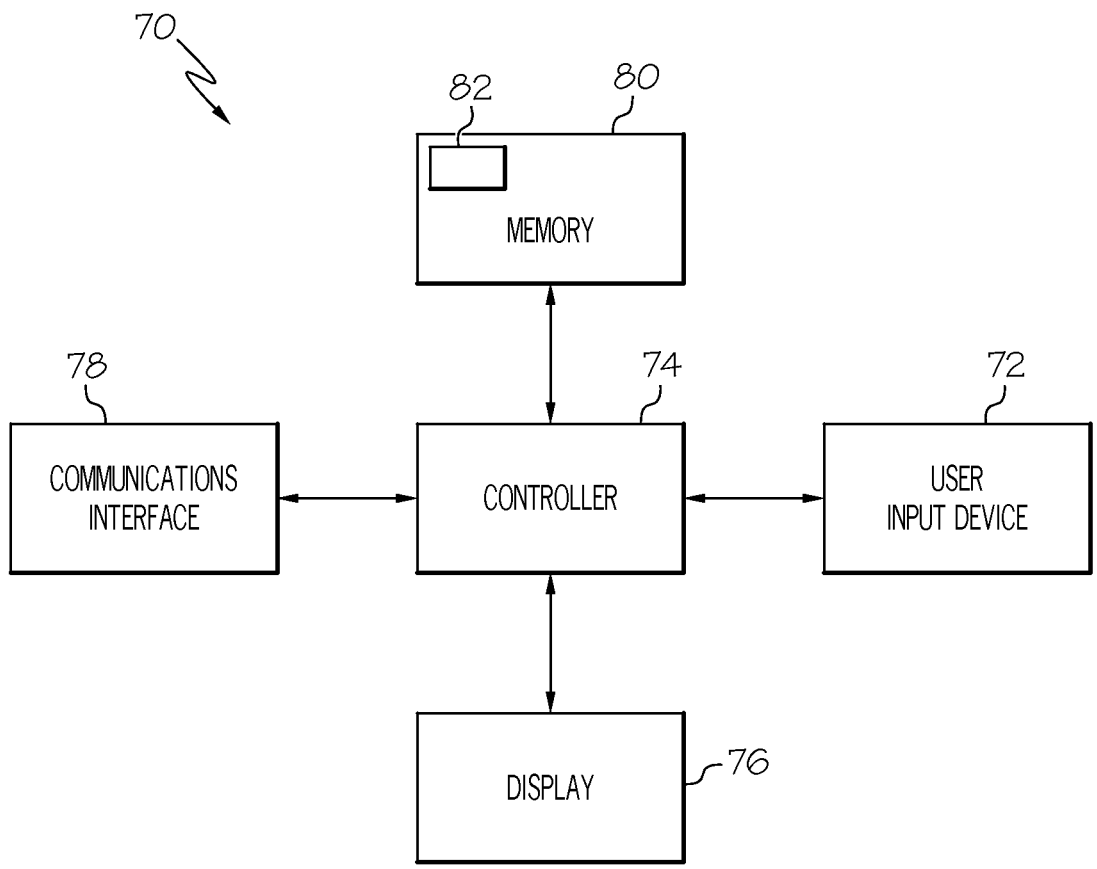
FIG. 7 is a block diagram illustrating some components of a computing device configured to define regions within a data range.

FIG. 7 is a block diagram illustrating some components of a computing device 70 configured to provide the slide control 38 for defining regions within a data range. The computing device 70 includes a user input device 72, a controller 74 and a display 76. The controller 74 is configured to receive, via the user input device 72, user input indicating N regions within a data range of a data variable, where N is greater than or equal to three. The display 76 is configured to display the slide control 38 representing the data range and the regions 40 within the data range. The slide control 38 includes N−1 sliders 42, with each slider representing an associated boundary between two of the regions 40. The controller 74 is further configured, responsive to movement of a selected slider 42, to reset its associated boundary. The computing device 70 also includes a communications interface 78 that may be used, for example, to receive a data variable value from data source 20. The computing device 70 also includes memory 80, and in that memory instructions 82 are stored for configuring the computing device 70 as described above.

The sliders 42 of the slide control 38 provide a convenient way for users to define regions 40 and the boundaries between those regions 40, and they remove concerns of entry of invalid data ranges, because the users can adjust the region boundaries with the sliders 42 and do not need to rely on manual entry of numeric values. Thus, unlike the prior art where thresholds in a data range were set by entering numeric values (which was error prone and required value familiarity) or using a dropdown menu control (which was unduly limiting), the embodiments described above provide an easy way for users to visualize the data range, and scale of the data within the data range, and to see all thresholds (i.e., region boundaries) in relation to one another, optionally with an indication of their associated label and display attribute (see fields 34, 36). Additionally, users can compare large numbers of thresholds more easily when multiple sliders are placed on a single page, and the optional labels for each data range 40 allow users to assign qualitative values to specific ranges in the data that reflect a business or otherwise actionable interpretation to the data (e.g., if we are in the "Critical" range then perform one or more predefined actions).

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
receiving user input indicating N regions within a data range of a data variable, where N is greater than or equal to three;
displaying a slide control representing the data range and the regions within the data range, the slide control comprising N−1 sliders, each slider representing an associated boundary between two of the regions;
responsive to movement of a selected slider, resetting its associated boundary;
receiving a data variable value;
determining which one of the regions within the data range the received data variable value falls within; and
based on the determining and the boundaries defined by the N−1 sliders of the slide control, displaying each of the following items separately from the slide control:
a graph of the data range that indicates which region the received data variable value falls within; and
a percentage value that indicates where the received data variable value falls within the data range;
wherein the user input comprises a label and a display attribute for each region, and
wherein the display attribute includes a color, a shading, or both;
wherein said displaying the slide control comprises displaying each region in the slide control according to its display attribute and displaying each label next to its associated region; and
wherein said displaying the graph comprises displaying a portion of the graph that is proportional to the percentage value according to the display attribute of the determined region that the received data variable value falls within.

2. The computer-implemented method of claim 1, wherein resetting the associated boundary comprises:
varying the size of the regions separated by the selected slider.

3. The computer-implemented method of claim 2, wherein varying the size of the regions comprises:
increasing the size of a first one of the regions on a first side of the selected slider by a first amount; and decreasing the size of a second one of the regions on an opposite second side of the selected slider by the same amount.

4. The computer-implemented method of claim 1, wherein the boundary between two of the regions represents an upper boundary for one of the regions and a lower boundary for the other of the regions.

5. The computer-implemented method of claim 1, wherein the N regions of the data range are contiguous and collectively cover the entire data range.

6. The computer-implemented method of claim 1, wherein the N regions of the data range define a spectrum of warning levels, and the graph of the data range indicates which warning level the data variable value falls within.

7. A computing device comprising:
a user input device; and
a control circuit configured to:
receive, via the user input device, user input indicating N regions within a data range of a data variable, where N is greater than or equal to three;
display, on an electronic display, a slide control representing the data range and the regions within the data range, the slide control comprising N−1 sliders, each slider representing an associated boundary between two of the regions;
reset the associated boundary of a selected slider responsive to movement of the selected slider;
receive, via the user input device, a data variable value;
determine which one of the regions within the data range the received data variable value falls within; and
based on the boundaries defined by the N−1 sliders of the slide control and the determination of which one of the regions the received data variable value falls within, display each of the following items on the electronic display separately from the slide control:
a graph of the data range that indicates which region the received data variable value falls within; and
a percentage value that indicates where the received data variable value falls within the data range;
wherein the user input comprises a label and a display attribute for each region, and wherein the display attribute includes a color, a shading or both;
wherein to display the slide control, the control circuit is configured to display each region in the slide control according to its display attribute and display each label next to its associated region; and
wherein to display the graph, the control circuit is configured to display a portion of the graph that is proportional to the percentage value according to the display attribute of the determined region that the received data variable falls within.

8. The computing device of claim 7, wherein to reset the associated boundary, the control circuit is configured to vary the size of the regions separated by the selected slider.

9. The computing device of claim 8, wherein to vary the size of the regions, the control circuit is configured to:
increase the size of a first one of the regions on a first side of the selected slider by a first amount; and
decrease the size of a second one of the regions on an opposite second side of the selected slider by the same amount.

10. The computing device of claim 7, wherein the boundary between two of the regions represents an upper boundary for one of the regions and a lower boundary for the other of the regions.

11. The computing device of claim 7, wherein the N regions of the data range are contiguous and collectively cover the entire data range.

12. The computing device of claim 7, wherein the N regions of the data range define a spectrum of warning levels, and the graph of the data range indicates which warning level the data variable value falls within.

13. A computer program product comprising:
a non-transitory computer readable storage medium having computer readable program code embodied therewith, that, when executed by a processing circuit of a computing device, causes the computing device to:
receive user input indicating N regions within a data range of a data variable, where N is greater than or equal to three;
display a slide control representing the data range and the regions within the data range, the slide control comprising N−1 sliders, each slider representing an associated boundary between two of the regions;
reset the boundary associated with a selected slider responsive to movement of that slider;
receive a data variable value;
determine which one of the regions within the data range the received data variable value falls within; and
based on the boundaries defined by the N−1 sliders of the slide control, display each of the following items separately from the slide control:
a graph of the data range that indicates which region the received value falls within; and
a percentage value that indicates where the received data variable value falls within the data range;
wherein the user input comprises a label and a display attribute for each region, and wherein the display attribute includes a color, a shading or both;
wherein the computer readable program code configured to display the slide control comprises computer readable program code configured to display each region in the slide control according to its display attribute and display each label next to its associated region; and
wherein the computer readable program code configured to display the graph comprises computer readable program code configured to display a portion of the graph that is proportional to the percentage value according to the display attribute of the determined region that the received data variable falls within.

14. The computer program product of claim 13, wherein the computer readable program code, when executed by the processing circuit to reset the associated boundary, further causes the computing device to:
vary the size of the regions separated by the selected slider.

15. The computer program product of claim 14, wherein the computer readable program code, when executed by the processing circuit to vary the size of the regions separated by the selected slider, further causes the computing device to:
increase the size of a first one of the regions on a first side of the selected slider by a first amount; and
decrease the size of a second one of the regions on an opposite second side of the selected slider by the same amount.

16. The computer program product of claim 13, wherein the boundary between two of the regions represents an upper boundary for one of the regions and a lower boundary for the other of the regions.

17. The computer program product of claim 13, wherein the N regions of the data range are contiguous and collectively cover the entire data range.

18. The computer program product of claim 13, wherein the N regions of the data range define a spectrum of warning levels, and the graph of the data range indicates which warning level the data variable value falls within.

\* \* \* \* \*